3,370,711
FILTER

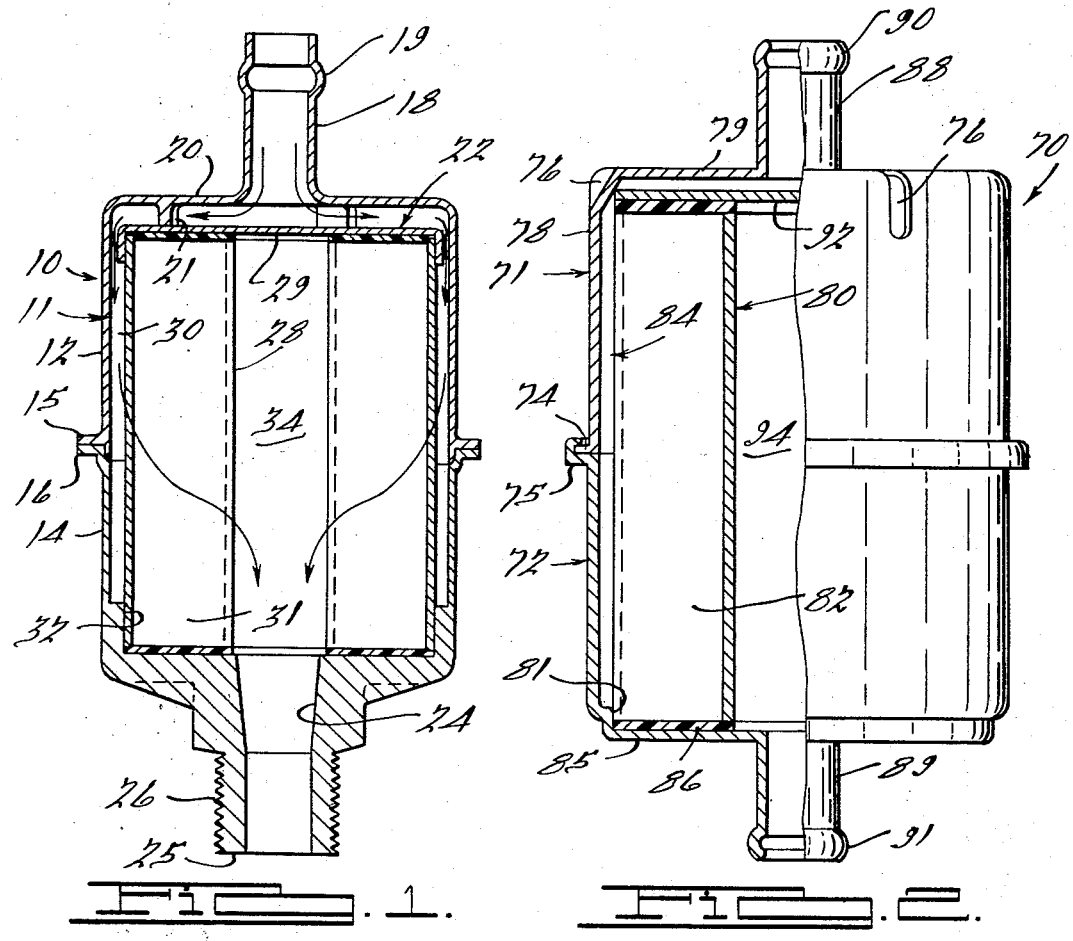

William S. Hitzelberger and Robert K. Hathaway, Racine, Wis., assignors to Walker Manufacturing Company, Racine, Wis., a corporation of Delaware
Continuation of application Ser. No. 3,069, Jan. 18, 1960. This application July 9, 1964, Ser. No. 381,437
1 Claim. (Cl. 210—448)

This application is a continuation of applicants' copending application Serial No. 3,069 filed Jan. 18, 1960 for filter, now abandoned.

This invention relates generally to filters, and more particularly to a full flow filtration unit.

Generally, fluid filters comprise a permanent housing and a replaceable filter element ranging from a fine metal screen to a fiber or ceramic member.

The present invention is directed to an improved full flow disposable filter assembly having a relatively large capacity so as to be capable of handling full fluid flow, yet having a relatively high filtering efficiency. Further, the filter, because of its relatively simple and therefore economical construction, is disposable after a predetermined length of use.

Accordingly, one object of the present invention is to provide an improved full flow filter.

Another object is to provide an improved disposable full flow filter.

Another object of the present invention is to provide a filter wherein the filter housing positions and maintains a filter element during assembly and operation thereof.

Other objects and advantages of the present invention will become apparent from the following detailed description wherein reference is made to the drawings, in which:

FIGURE 1 is a vertical cross section of an exemplary embodiment of a filter unit in accordance with the present invention;

FIG. 2 is a side elevational view, partially in section, of a modified filter; and FIG. 3 is a top view of the filter of FIG. 2.

A full flow filter 10, in accordance with an exemplary embodiment of the present invention, comprises a casing or housing 11 having upper and lower shells 12 and 14 joined together as by cementing or welding a pair of juxtaposed peripheral flanges 15 and 16 thereon, respectively. The upper shell 12 has an upwardly extending inlet nipple 18 having a suitable annular bead 19 for sealing acceptance within a fluid conduit (not shown). An upper end wall 20 on the upper shell 12 is provided with a plurality of downwardly extending nibs 21 that position a filter element 22 internally of the casing 11. The bottom shell 14 of the filter casing 11 is provided with a central aperture or outlet 24 for the discharge of filtered fluid. The bottom shell 14 has a downwardly extending nipple 25 having a suitable threaded portion 26 for engagement with a complementary threaded coupling (not shown).

The filter element 22 comprises a tubular member 28, which is preferably of pleated paper construction, having an imperforate upper end plate 29 (preferably of cardboard or plastic) that aids in positioning and locating the filter element 22 within the casing 11 and insures that fluid entering the filter 10 passes radially outwardly of the filter element 22 into an annular passageway 30 between the outer walls of the casing 11 and the filter element 22. The end plate 29 is secured to the member 28 as by cementing. A bottom end 31 of the filter element 22 is accepted in a circular recess 32 in the bottom shell 14 of the casing 11 and is biased thereinto by engagement of the nibs 21 on the upper shell 12 with the end plate 29 on the filter element 22. The lower end 31 of the member 28 is positively held in the recess 32, in fluid sealing relationship with the bottom shell 14, as by cementing, the shell 14 thus forming the end plate for the pleated filter paper.

Fluid entering through the upper nipple 18 passes radially outwardly around the filter element 22 into the annular chamber 30, then through the filter element 22 into a central reservoir 34 within the filter element 22, and then downwardly and outwardly through the outlet 24 and lower nipple 25.

Referring to FIGS. 2 and 3, a modifier filter 70 has upper and lower shells 71 and 72 joined to one another as by engagement of a pair of peripheral flanges 74 and 75. The flange 75 is folded or crimped over the flange 74, and, in conjunction with a suitable cement, sealably holds the shells 71 and 72 together. The upper shell 71 is provided with a plurality of circumferentially spaced inwardly directed embossments 76 that extend inwardly at an angle with respect to both the side wall 78 and upper end wall 79 of the shell 71 to position a pleated paper filter element 80 radially and axially of the filter 70.

The bottom shell 72 has an annular shoulder 81 thereon that positions a lower end 82 of the filter element 80 radially of the filter 70 so as to position the element 80 in conjunction with the embossments 76 on the upper shell 71 to define an annular chamber 84 between the outer peripheral surface of the filter element 80 and the side walls of the filter 70. The lower end 82 of the filter element 80 is biased downwardly by the embossments 76 toward a transverse end wall 85 on the lower shell 72 and is secured thereto as by cement 86 so that end wall 85 acts as an end plate.

The upper and lower shells 71 and 72 have upwardly and downwardly extending nipples 88 and 89, respectively, having annular beads 90 and 91 thereon for sealing engagement with a pair of suitable fluid conduits (not shown). Fluid entering the upper nipple 88 must pass radially outwardly between an imperforate upper end plate 92 on the filter element 80 and the transverse end wall 79 on the upper shell 71, then axially downwardly through the annular chamber 84, then through the filter element 80 and into a central chamber 94 therein, then downwardly and outwardly through the lower nipple 89.

It will be noted that the filter structure of FIG. 1 is such that the housing can be readily formed from molded plastic while the filter housings of the other embodiments can be readily formed by stamping or press operations from sheet metal. These features facilitate economical manufacture of the filters so that they can be used as replaceable items in automobiles, home heating units, and similar applications.

It is to be particularly noted that in the embodiments of FIGS. 1, 2 and 3 a portion of the filter housing serves as an end cap for one end of the pleated filter paper annulus, such end being adhered to the casing with a suitable fluid impervious cement or adhesive. In these embodiments a part of the filter casing serves as a centering and locating means for the filter element. This is of particular value in the mass manufacture of these devices since it insures proper placement of the filter element inside the casing when the upper half of the casing is secured to the lower half.

In manufacture, the halves of the casing which can center and support the filter cartridge will be disposed so that their open sides face upwardly and the cartridges will be seated in them, extending vertically and held by gravity on the seats or recesses. Thereafter the other halves of the casing are placed over the cartridge so that the flanges meet and are tightly secured together.

While it will be apparent that the embodiments of the invention herein disclosed are well calculated to fulfill the objects of the invention, it will be appreciated that the invention is susceptible to modification, variation and change without departing from the proper scope or fair meaning of the subjoined claim.

What is claimed is:
1. A full flow filtration unit comprising a two piece casing assembly and an annular pleated paper filter element contained within said casing assembly, said casing assembly defining a generally cylindrical chamber closed at opposite ends by transverse end walls, one of said end walls being formed with an inlet aperture in registry with said cylindrical chamber, the other of said end walls being formed with an outlet aperture in registry with said cylindrical chamber, said pleated paper filter element defining a central chamber, an end cap secured to one end of said filter element for fixing the pleats thereof in position and for forming a closure for one end of said central chamber, said end cap being spaced from one of said end walls and from the aperture therein for fluid communication to said aperture therein, means on said one end wall engaging said end cap for fixing the spacing of said end cap from said one end wall, the outer periphery of the pleats of said element being spaced inwardly of the wall of said casing defining said cylindrical chamber for fluid communication with the outer periphery of said filter element, said casing being formed with a radially inwardly extending portion adjacent the other of said end walls, said radially inwardly extending portion being in engagement with the outer periphery of the pleats of said filter element for radially locating said filter element within said cylindrical chamber, and adhesive means for affixing the pleats at the other end of said filter element directly to the other of said end walls with the other end of said central chamber of said filter element in registry with the aperture in said other end wall for fluid communication between said aperture and said central chamber for radial fluid flow through said filter element between said inlet aperture and said outlet aperture.

References Cited

UNITED STATES PATENTS

| 2,932,398 | 4/1960 | Korte | 210—448 X |
| 3,002,870 | 10/1961 | Belgarde et al. | 210—446 X |
| 3,087,849 | 4/1963 | Smith | 210—445 |
| 3,202,287 | 8/1965 | Szwargulski et al. | 210—448 X |

FOREIGN PATENTS

| 1,143,840 | 4/1957 | France. |
| 1,216,783 | 11/1959 | France. |
| 841,818 | 7/1960 | Great Britain. |

SAMIH N. ZAHARNA, *Primary Examiner.*

REUBEN FRIEDMAN, *Examiner.*

F. MEDLEY, *Assistant Examiner.*